(12) United States Patent
Ohta et al.

(10) Patent No.: US 7,252,010 B2
(45) Date of Patent: Aug. 7, 2007

(54) PRESSURE SENSOR SYSTEM WITH SEMICONDUCTOR CHIP AND ANTENNA MEMBER

(75) Inventors: Hiroyuki Ohta, Tsuchiura (JP); Takashi Sumigawa, Fukuoka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/239,018

(22) Filed: Sep. 30, 2005

(65) Prior Publication Data

US 2006/0219022 A1    Oct. 5, 2006

(30) Foreign Application Priority Data

Oct. 1, 2004   (JP) ............................... 2004-289509

(51) Int. Cl.
*G01L 9/00* (2006.01)
(52) U.S. Cl. ....................................................... 73/754
(58) Field of Classification Search .................. 73/754, 73/146, 146.5; 340/445
See application file for complete search history.

(56) References Cited

U.S. PATENT DOCUMENTS

| 4,067,235 A | * | 1/1978 | Markland et al. ........... 73/146.5 |
| 4,857,893 A | * | 8/1989 | Carroll ..................... 340/572.7 |
| 6,885,291 B1 | * | 4/2005 | Pollack et al. ............... 340/445 |

FOREIGN PATENT DOCUMENTS

JP    2001-187611    7/2001

* cited by examiner

*Primary Examiner*—Andre J. Allen
(74) *Attorney, Agent, or Firm*—Antonelli, Terry, Stout & Kraus, LLP.

(57) ABSTRACT

In order to realize a compact wireless pressure sensor system which transmits an accurate pressure value, the present invention provides a pressure sensor system constructed at least by a silicon chip on which a circuit operated by electromagnetic wave energy is mounted, and a film which supports an antenna, in which film a through-hole is provided in the vicinity of a diaphragm part.

9 Claims, 25 Drawing Sheets

PRESSURE SENSOR SYSTEM WITH SEMICONDUCTOR CHIP AND ANTENNA MEMBER

BACKGROUND OF THE INVENTION

The present invention relates to a pressure sensor system for detecting dynamical quantity such as pressure of gas or fluid.

A tag referred to as an RF tag, in which electric power supplied by electromagnet induction is used to activate a circuit to transmit a previously set ID number by a radio wave, is developed and starts to be applied to physical distribution management and management of admission tickets and the like. A trial to transmit a temperature measurement value by wireless by connecting a temperature sensor to such an ID tag is also performed. For example, a sensor-equipped ID tag is constructed by connecting a temperature sensor to an RF tag circuit on a printed wiring board, and by integrally molding those with plastic in a state of being mounted on the printed wiring board, as shown in JP-A-2001-187611.

BRIEF SUMMARY OF THE INVENTION

However, the above described document does not disclose an embodiment which is capable of measuring pressure with high accuracy. Also, the above described document does not disclose an embodiment which is capable of performing highly accurate measurement when a pressure sensor is used in a state of being fixed to an object to be measured.

Accordingly, the present invention provides a pressure sensor system capable of suppressing any of the above described problems.

In order to solve the above described problems, for example, in a film 207 which supports an antenna of a silicon chip 2, a through-hole 209 is provided in the vicinity of a portion opposed to a diaphragm part 201. The placement position of the through-hole 209 in the film 207 includes an inside of the area where the silicon chip 2 is placed.

In concrete, it is preferable to include the following embodiments.

(1) A pressure sensor system includes a semiconductor chip having a pressure sensor and a transmit control part into which a signal based on a measurement value of the pressure sensor is inputted, and an antenna member to which the above described semiconductor chip is fixed and which antenna member has an antenna electrically connected to the transmit control part, and is characterized in that the above described antenna member has a notched part in an area which overlaps the above described semiconductor chip.

(2) In above described item (1), the pressure sensor system is characterized in that the pressure sensor is located in the area where the notched part is formed.

(3) In above described item (1), the pressure sensor system is characterized by including a plurality of the above described antenna members, to which the above described semiconductor chip is fixed.

(4) In above described item (1), the pressure sensor system is characterized in that the above described semiconductor chip is disposed in the area of the notched part of the substrate.

(5) In above described item (1), the pressure sensor system is characterized in that the above described antenna member is provided with a high magnetic permeability layer having higher magnetic permeability than the periphery thereof.

(6) A pressure sensor system includes a semiconductor chip having a pressure sensor and a transmit control part into which a signal based on a measurement value of the pressure sensor is inputted, and an antenna member to which the above described semiconductor chip is fixed and which antenna member has an antenna electrically connected to the transmit control part, wherein an opposite side surface to a surface of the above described semiconductor chip on which the transmit control circuit is formed is formed so as to be supported by the above described antenna member.

(7) In above described item (4), the pressure sensor system is characterized by including a high magnetic permeability layer having the notched part, and in that the above described semiconductor chip is disposed in the area where the notched part is formed.

Besides, it is preferable to provide a through hole or a notch in the film or the thin plate so as to include an inside of the area where the semiconductor chip is placed. Alternatively, it is preferable to provide a light shielding layer on a surface layer of the semiconductor chip. Otherwise, it is preferable to place the above described pressure sensor system inside an inner wall of a container.

(8) A pressure measurement receiving device is characterized by including a receiving part which receives a signal from the pressure sensor system described in above item (1) installed in an object to be measured, and a recording part which records the received signal.

(9) A pressure measuring container includes a container capable of accommodating liquid or gas therein, and the pressure sensor system described in above item (1) placed in the container, and is characterized in that a surface of the above described semiconductor chip, on which the transmit and reception control circuit is formed, is disposed so as to be opposed to an inner wall of the container.

(10) A pressure measuring container includes a container capable of accommodating liquid or gas therein, and the pressure sensor system described in above item (1) placed in the container, and is characterized in that a back surface of a surface of the above described semiconductor chip, on which the transmit and reception control circuit is formed, is disposed so as to be opposed to an inner wall of the container.

It is preferable that the antenna part of the pressure sensor system is disposed in an arrangement near to parallel, rather than perpendicular, with respect to a wall surface of an object to be measured.

By including the above described embodiments, pressure measurement with high accuracy can be achieved. Also, the measurement with high accuracy can be performed when using the pressure sensor system in an embodiment in which the pressure sensor system is fixed to the object to be measured.

According to the present invention, the pressure sensor system capable of contributing to solution of any of the above described problems can be provided.

Other objects, features and advantages of the invention will become apparent from the following description of the embodiments of the invention taken in conjunction with the accompanying drawings.

DETAILED DESCRIPTION OF THE INVENTION

Figure 1:
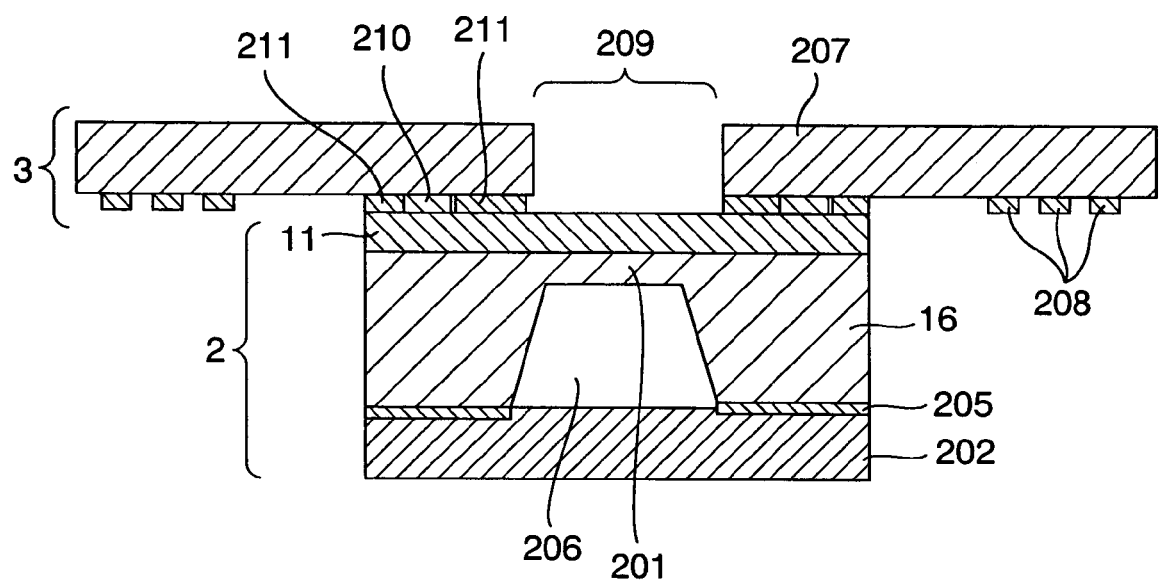
FIG. 1 is a schematic sectional view of a pressure sensor system of a first embodiment of the present invention.
Figure 2:
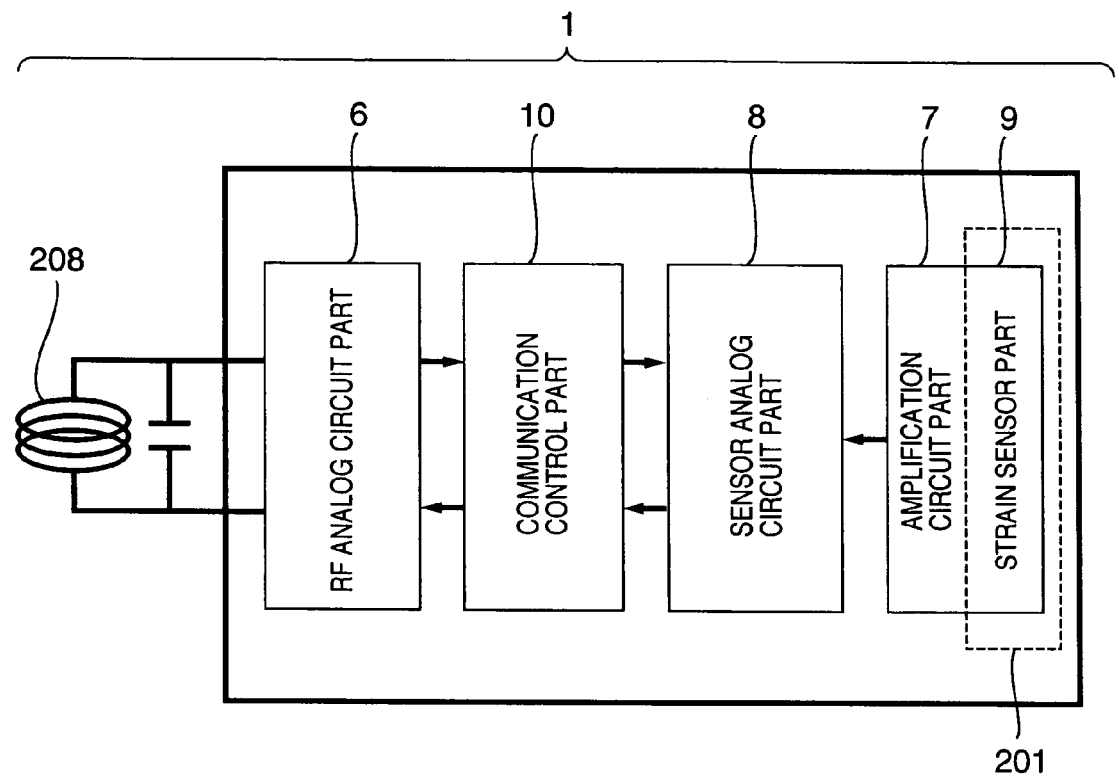
FIG. 2 is a circuit diagram of a measuring part in the first embodiment of the present invention.

Hereinafter, a first embodiment of the present invention will be described by using FIGS. 1 to 17. FIG. 1 shows a pressure sensor system 1 which is the first embodiment of the present invention. A strain sensor system 1 of this embodiment is constructed at least by a semiconductor chip (an example of a silicon chip will be described hereinafter as an example in this case) 2 and an external antenna member 3. As shown in a circuit block diagram of FIG. 2, the silicon chip 2 is constructed at least by an RF analogue circuit part 6 which modulates and demodulates a signal transmitted by a carrier wave of 13.56 MHz, 2.45 GHz, 860 to 960 MHz or the like and generates a DC power supply, an amplification circuit part 7 for a strain signal, a sensor analogue circuit part 8 which performs A/D conversion, a strain sensor 9, a communication control circuit part 10 and a diaphragm part 201 for a pressure sensor. The strain sensor 9 is placed in the diaphragm part 201. The strain sensor includes a plurality of sensor parts.

Namely, for example, the silicon chip is characterized by including an electronic circuit which generates the DC power supply from electromagnetic wave energy received from an outside.

Alternatively, the silicon chip is characterized by including an RF analog circuit for modulating and demodulating an electromagnetic wave signal and generating the DC power supply, a logical circuit which performs chip operation control, a pressure sensor circuit which measures pressure, and an amplification circuit for the above described pressure sensor signal.

Figure 3:
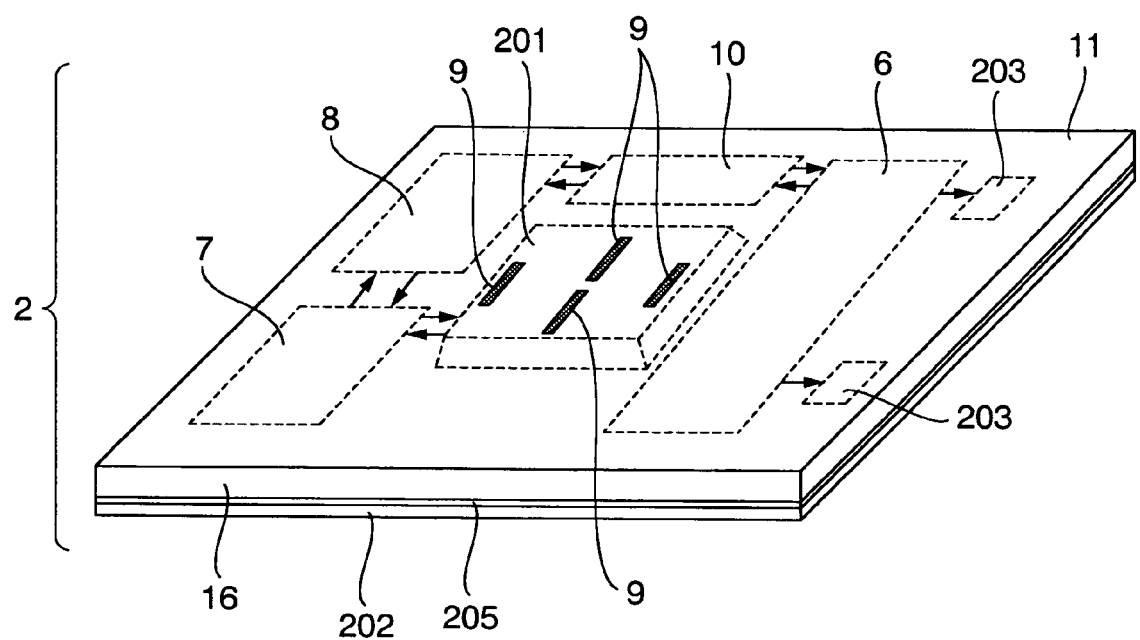
FIG. 3 is a schematic perspective view of a silicon chip in the first embodiment of the present invention.

Besides, as shown in a perspective view of the silicon chip 2 of FIG. 3, it is desirable that the diaphragm part 201 is provided at a central part of the silicon chip, and is surrounded by the other circuits.

The external antenna 3 is constructed at least by an antenna 208, a film 207 and a connecting part 211. FIG. 1 shows an example in which the antenna 208 is provided on one side surface of the film 207, however, the antenna 208 may be provided on both surfaces via a though hole. Alternatively, the antenna 208 may be provided on an opposite surface. The film 207 is provided with a through-hole 209 at a position corresponding to the diaphragm part 201 in the silicon chip 2. Further, it is desirable to fix the silicon chip 2 and the film 207 with a fixing part 211 for mechanical connection thereof, and it is more desirable to fix those with a potting resin or the like to cover a back surface of the silicon chip 2 in view of mechanical reliability.

A pressure value is obtained by detecting a strain generated in conjunction with deformation of the diaphragm part 201 using the strain sensor 9 formed on a surface in the vicinity of the diaphragm 201. It is desirable that the strain sensor 9 is an impurity diffusion layer resistor utilizing the piezo resistance effect, however, it is possible to substitute a sensor corresponding to a resistance wire type of strain gauge therefor if its purpose does not require high accuracy, while it is inferior in performance. Besides, the sensor may be made by forming a polycrystalline silicon film on a silicon substrate. In this embodiment, although the embodiment shown in connection with a diaphragm type of pressure sensor in which the silicon substrate is used as a diaphragm is preferable, the diaphragm may be constructed by a thin film. For measurement of pressure, the pressure sensor may be an electrical capacitance type, in place of the diaphragm type. Also in this case, the present patent is similarly effective for measuring accurate pressure.

Figure 4:
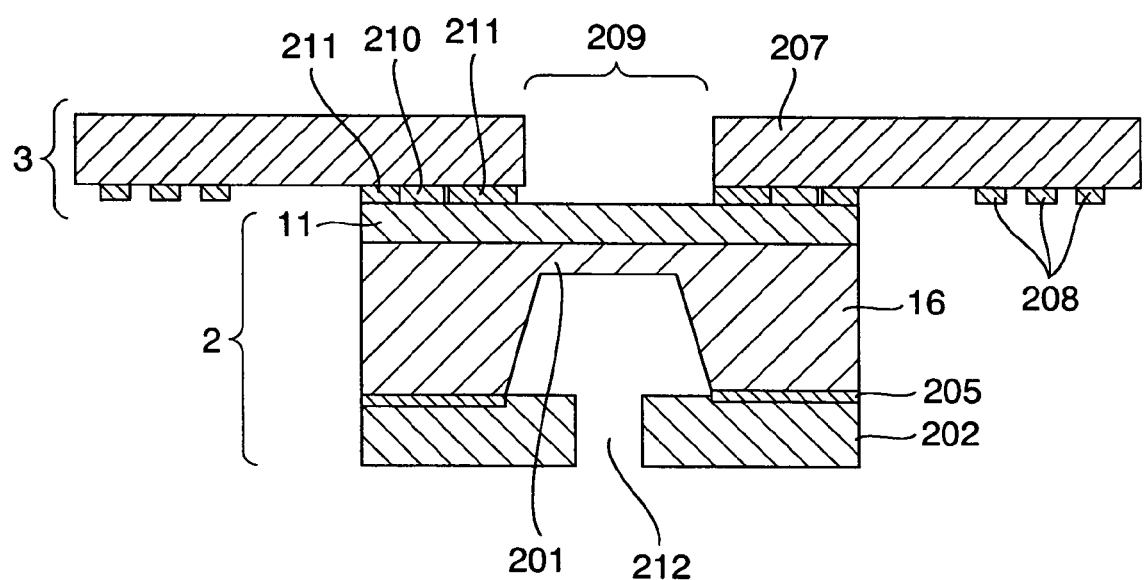
FIG. 4 is a schematic sectional view of the pressure sensor system in the first embodiment of the present invention.
Figure 5:
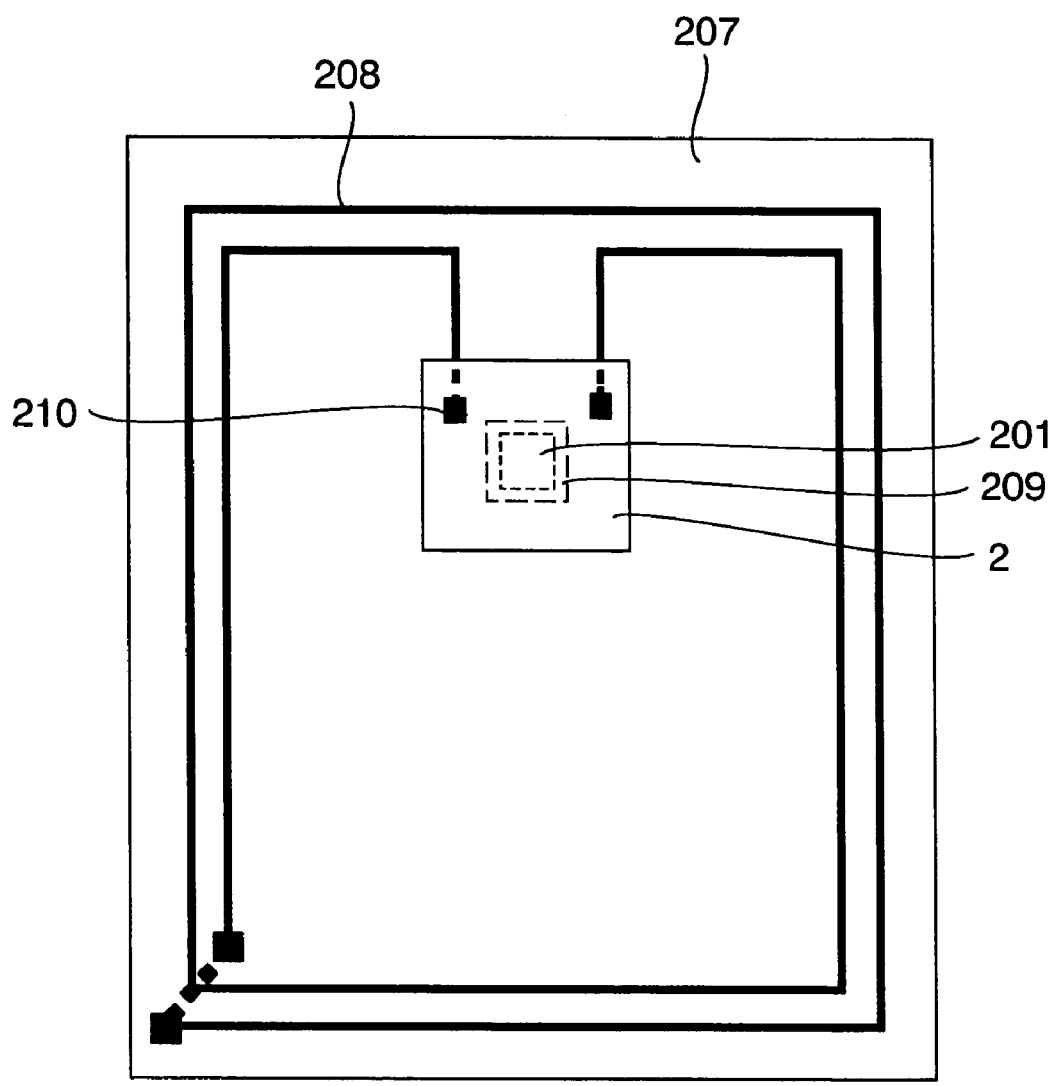
FIG. 5 is a schematic plane view of the pressure sensor system in the first embodiment of the present invention.

The diaphragm part 201 is indicated as a portion with small thickness in the silicon substrate 16. An object of this embodiment is to use the pressure sensor system 1 as an absolute pressure sensor, but the present invention may be used for a differential pressure sensor. When using it as an absolute pressure sensor, it is desirable to depress or vacuum a cavity 206 of the diaphragm part 201 more than its periphery in order to prevent cubical expansion of gas caused by change in temperature. In this embodiment, the portion with small silicon plate thickness, namely, the diaphragm part 201 is locally formed at the central part of the silicon substrate 16, and a surface on an opposite side to a device forming surface 11 is sealed with a sealing part 202. The diaphragm part 201 may be formed by using anisotropic wet etching typified by a potassium hydroxide solution, or dry etching with strong anisotropy. Besides, it is desirable to perform diffusion bonding to provide a bonding layer 205 for sealing the silicon substrate 16 and the sealing part 202, but it is also possible to achieve sealing by bonding those using an adhesive agent. The sealing by the adhesive agent has the advantage of allowing it to be manufactured at low cost. In the embodiment shown in FIG. 1, the sealing part 202 is provided for using as an absolute pressure sensor, but when using as a differential pressure sensor, an air hole 212 may be provided in the sealing part 202 as shown in FIG. 4, or the sealing part 202 may be omitted. Also in that case, the same effect as this embodiment can be obtained.

Figure 7:
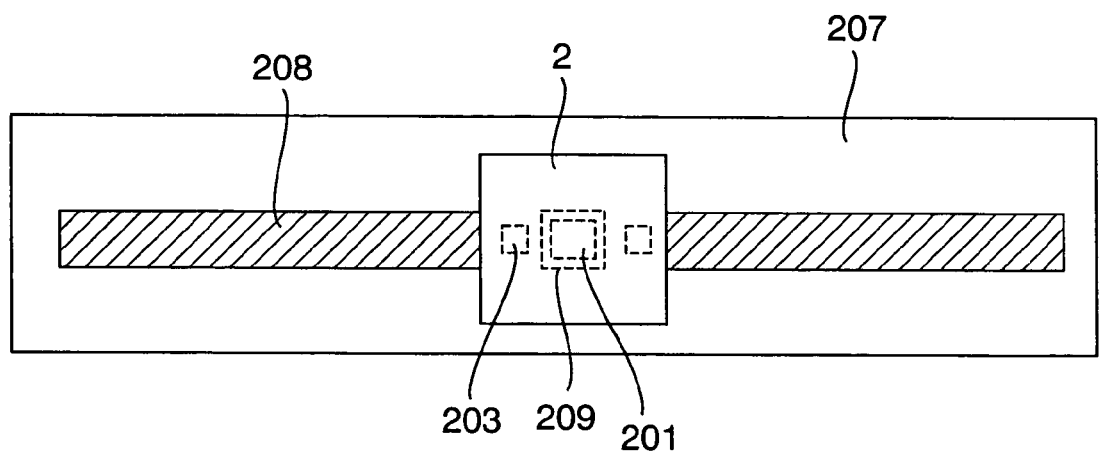
FIG. 7 is a schematic plane view of the pressure sensor system in the first embodiment of the present invention.
Figure 22:
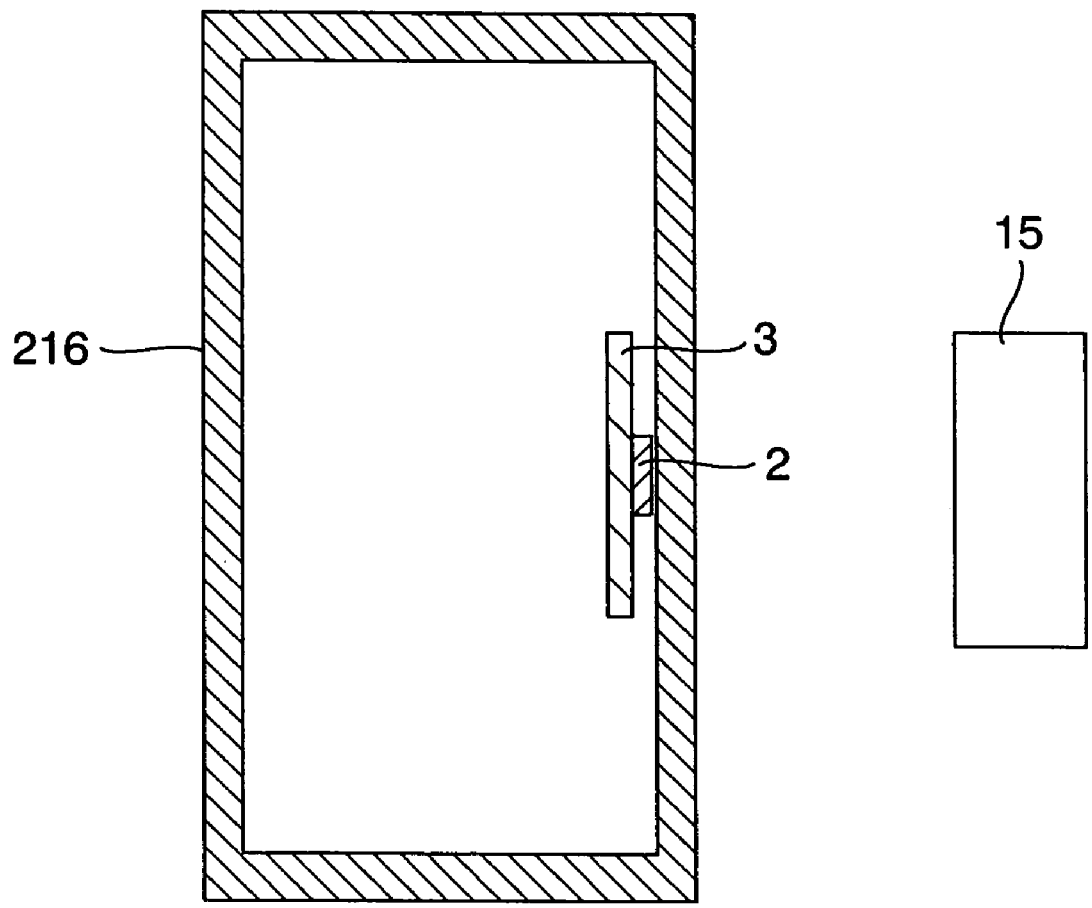
FIG. 22 is a schematic view of a pressure measuring system of the present invention.

Next, an operation principle of the pressure sensor system 1 will be described. By supplying an electromagnetic wave from a reader 15, the pressure sensor system 1 can operate a circuit by the energy of the electromagnetic wave (FIG. 22). The pressure sensor system 1 detects pressure of fluid or gas by the diaphragm part 201 and the strain sensor 9, amplifies this in the amplification circuit 7, and then converts this into digital data in the sensor analog circuit 8. The pressure sensor system 1 transmits the measurement value to the reader 15 through the antenna 208 while using the communication control circuit 10 and the RF analog circuit part 6. The pressure sensor system 1 can operate utilizing the electromagnetic wave of the reader 15 as power supply in this manner, and therefore, the pressure value can be easily monitored by wireless. FIGS. 1 and 4 show the case of a loop type antenna, but a dipole-antenna as shown in FIG. 7, a Yagi-Uda antenna and a patch antenna may be used depending on the frequency in use. While this embodiment utilizes an antenna using electromagnetic induction in which an induction electromagnetic field is formed therein, or an antenna using a microwave by receiving and demodulating it, it is possible to utilize energy by mutual induction of a coil, or energy supply and communication using light.

Figure 25:
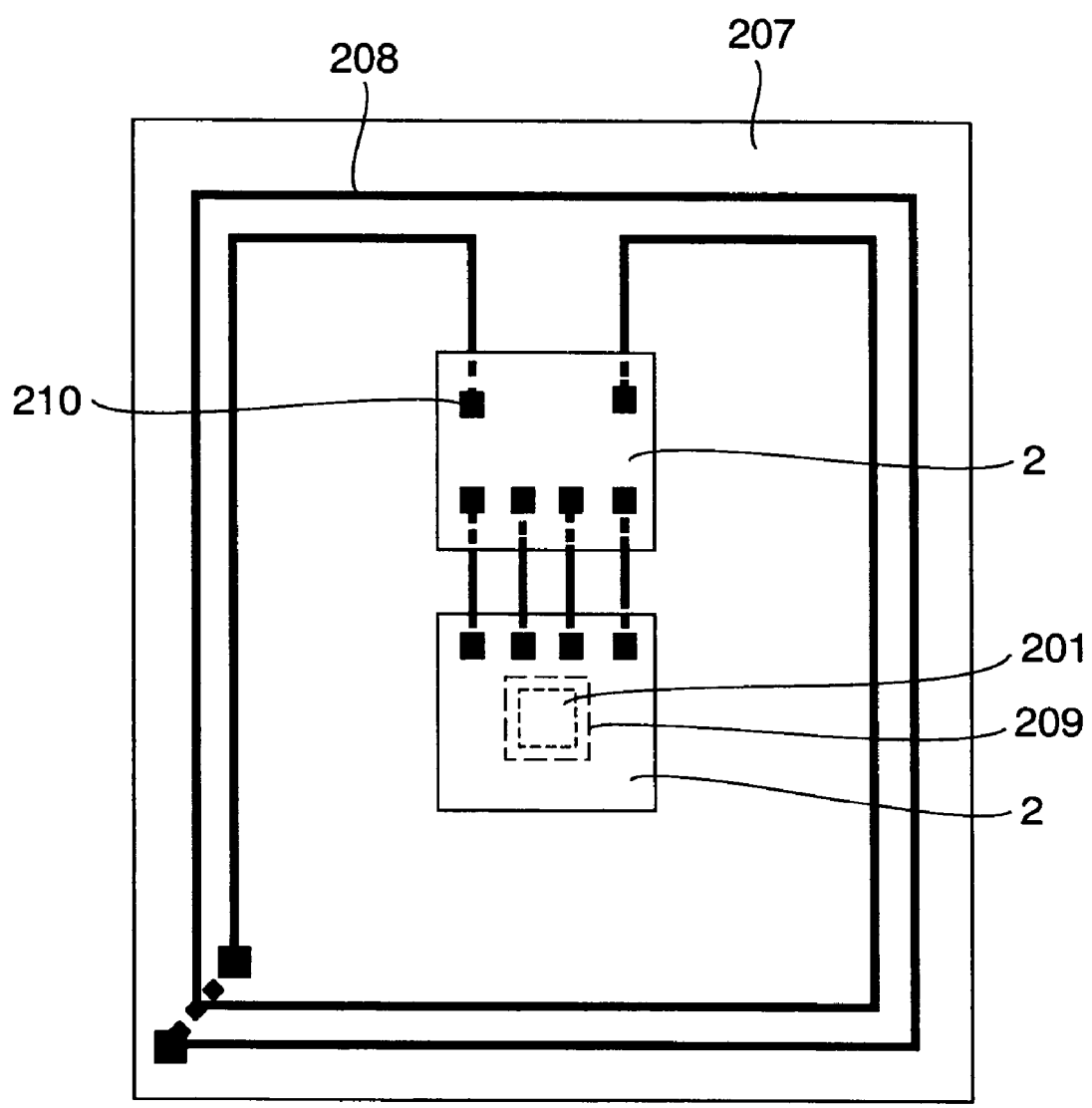
FIG. 25 is a schematic plane view of the pressure sensor system in the first embodiment of the present invention.

The antenna 208 is electrically connected to the silicon chip 2 via the connection part 211, and in the case of this embodiment, the device forming surface 11 of the silicon chip 2 and the film 207 are provided so as to be opposed to each other. As shown in FIGS. 1 and 4, the through-hole 209 is formed in the film 207 so that the film 207 which supports the antenna 208 does not interfere with or contact the diaphragm part 201. As shown in a plane view of FIG. 5 by a dotted line, this through-hole 209 is provided just below the diaphragm part 201 so as not to contact the diaphragm part 201, and it is desirable that the size of the through-hole 209 is equivalent to or larger than the diaphragm part 201. However, even when the through-hole 209 is smaller than the diaphragm part 201, the following effect can be obtained to some extent. Even when the silicon chip 2 is divided into two as shown in FIG. 25, the same effect can be also obtained by providing the through-hole 209 in the portion having the pressure sensor.

The fluid and gas to be measured in the pressure sensor system 1 can act on the diaphragm part 201 via the through-hole from an outside to deform the diaphragm part 201. That is, the external pressure can directly act on the diaphragm part as a result that the through-hole 209 is formed in the film 207, and therefore, the advantage of being capable of accurate measurement is provided. Especially when measuring fast pressure fluctuation variation, the fast pressure fluctuation cannot be transmitted to the diaphragm part 201 without the through-hole 209 so that only a blunt measurement value can be obtained. In this embodiment, the through-hole 209 is provided, and therefore, the advantage of being capable of also measuring dynamic pressure fluctuation accurately is obtained. Further, if the through-hole 209 is not provided, the diaphragm part 201 is deformed to contact the film 207 when measuring high pressure, and the deformation of the diaphragm part 201 becomes nonlinear, which causes the problem of significantly reducing measurement accuracy. On the other hand, in this embodiment, since the through-hole 209 is provided, the diaphragm part 201 and the film 207 do not interfere with each other to provide the advantage of being capable of accurately measuring the pressure over a wide measurement range. Besides, in the pressure sensor, the deformation amount of the diaphragm per unit pressure becomes large by making the silicon thickness of the diaphragm part 201 small, and therefore, the highly sensitive pressure sensor can be created, but the diaphragm part 201 will easily contact the film 207 above the diaphragm part 201 correspondingly. However, in this embodiment, the diaphragm part 201 and the film 207 do not interfere with each other, and therefore, there is the advantage of being capable of forming the highly sensitive diaphragm part 201.

In addition, the device forming surface 11 except for the diaphragm part 201 can be protected by the film 207, and therefore, there is the advantage of being capable of performing measurement with reliability even when it is used for a long time. As described above, according to this embodiment, it is possible to provide a pressure measuring apparatus capable of performing highly accurate measurement even in the case that one silicon substrate (or one chip) is provided with functions of: operating the pressure sensor by using electric power supplied by an electromagnetic wave; converting the obtained pressure measurement data to a digital form; and then sending back this value to the reader 15.

As described above, the pressure sensor system 1 is characterized by including: a semiconductor chip having a pressure sensor and a transmit control part into which a signal based on a measurement value of the above described pressure sensor is inputted; and an antenna member to which the above described semiconductor chip is fixed, which antenna member has an antenna electrically connected to the above described transmit control part, and a notched part in an area which overlaps the above described semiconductor chip.

The above described notched part is thinner in thickness than at least its periphery, or has a penetrated part formed therein. As a concrete example, the penetrated part can be formed so as to be enclosed in its periphery, such as an opening. Alternatively, a part of its periphery can be in the form which is not continuous.

It is preferable that the above described pressure sensor part is located in the area where the above described notched part is formed.

Figure 6:
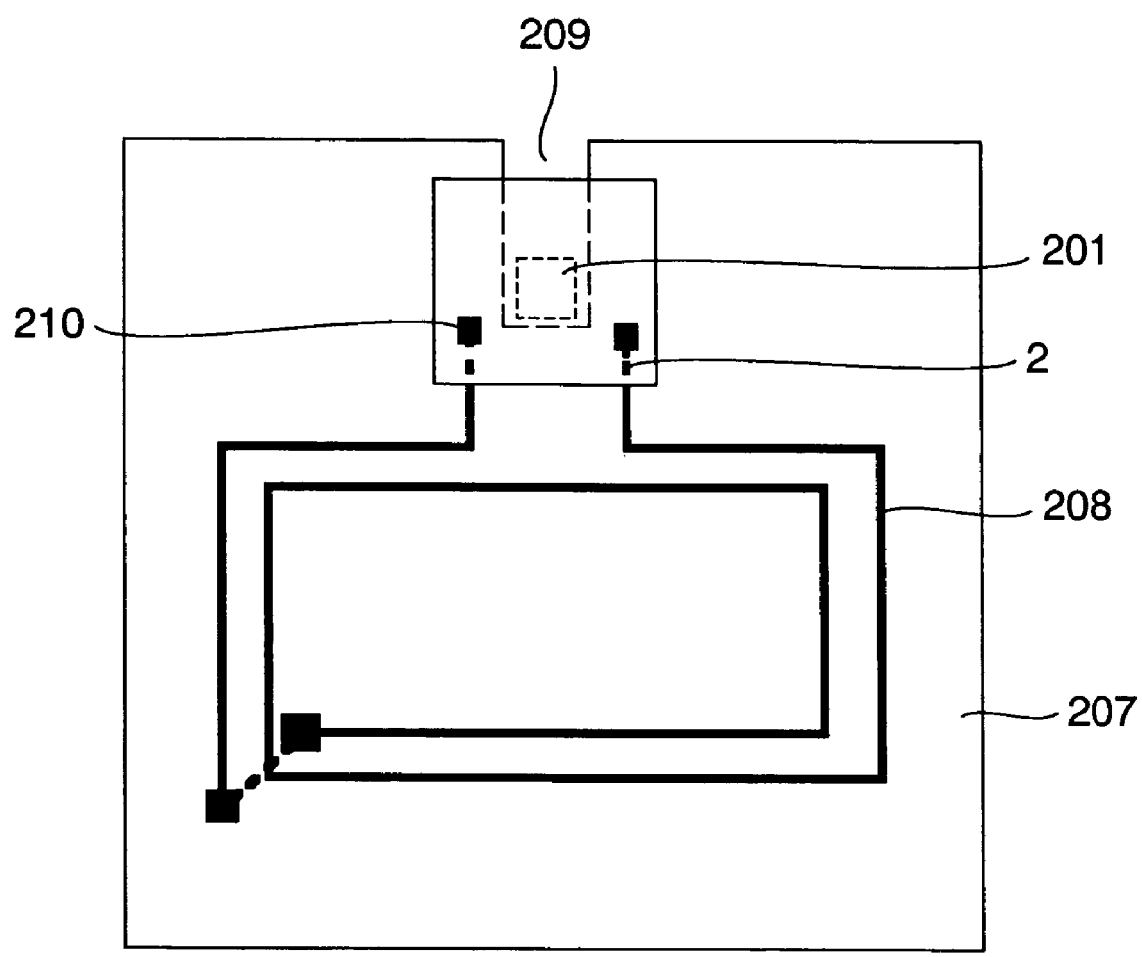
FIG. 6 is a schematic plane view of the pressure sensor system in the first embodiment of the present invention.
Figure 8:
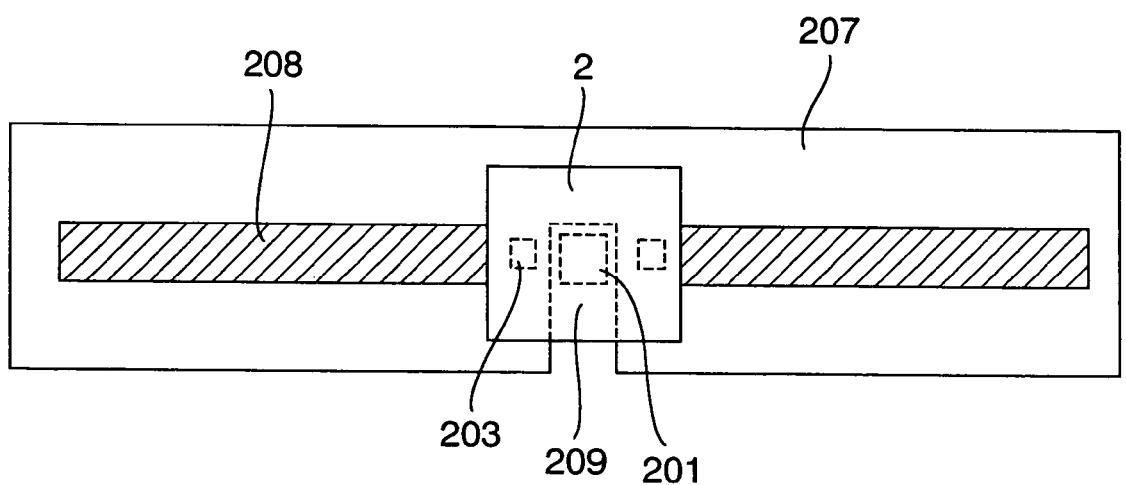
FIG. 8 is a schematic plane view of the pressure sensor system in the first embodiment of the present invention.
Figure 9:
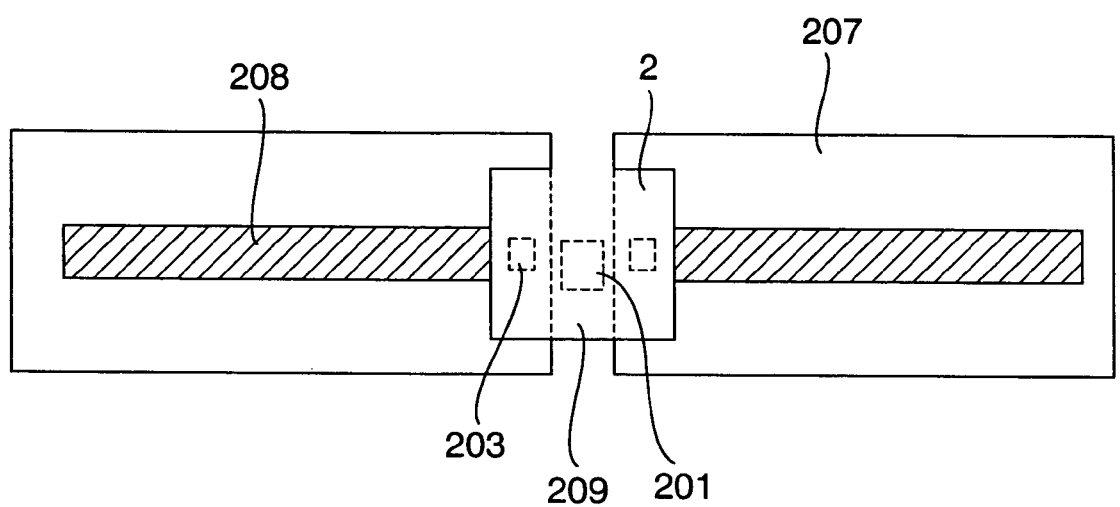
FIG. 9 is a schematic plane view of the pressure sensor system in the first embodiment of the present invention.

In this embodiment, the case of the construction by one chip is shown, however, the same effect is provided in the case where the same function is exhibited with a plurality of chips. In the case of the chip provided with the diaphragm 201, the through-hole 209 is provided as described above. As shown in FIG. 6, the through-hole 209 may be in the groove shape, namely, the film 207 may be notched. In this case, it is desirable that the silicon chip 2 is disposed outside the antenna loop. In this case, in addition to the above described advantage, the antenna 208 and the silicon chip 2 are away from each other, and therefore, there is the advantage that it is difficult for the device in the silicon chip 2 to be influenced by the electromagnetic wave. This construction can be similarly applied to the dipole antenna as shown in FIG. 7. The film 207 provided just below the diaphragm part 201 may be notched as shown in FIG. 8, or the film 207 may be cut into two separate parts as shown in FIG. 9.

As described above, the pressure sensor is characterized by including a plurality of the above described antenna members, to which the above described semiconductor chip is fixed. As a concrete embodiment, at least a silicon chip having an electronic circuit capable of measuring pressure and an antenna may be provided on a plurality of films or plates, and the silicon chip may be provided to lie over the plurality of films or plates.

Figure 10:
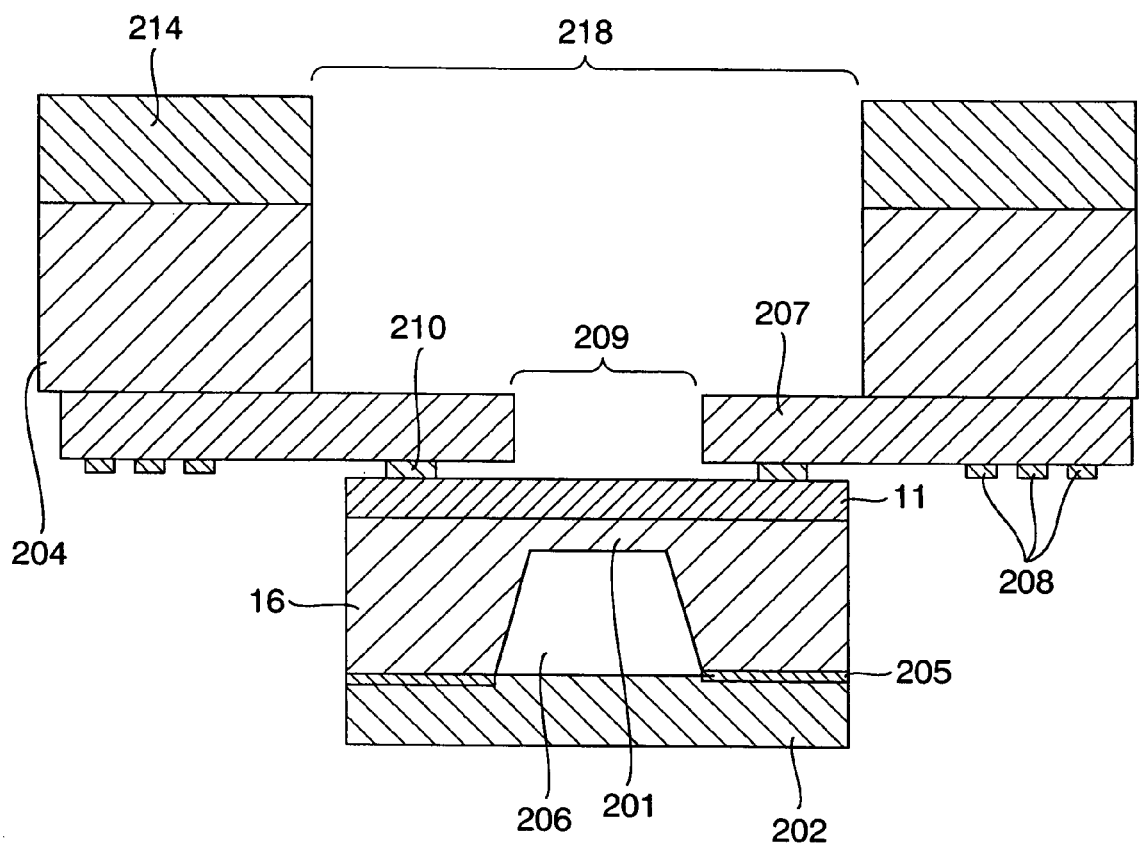
FIG. 10 is a schematic sectional view of the pressure sensor system in the first embodiment of the present invention.

FIG. 10 shows the case where a high magnetic permeability layer 204 is provided below the antenna 208. When a large metal member exists around the pressure sensor system 1 in the present invention, the electromagnetic wave from the reader 15 is reflected at the metal surface. Therefore, energy loss increases, so that communication distance significantly decreases. However, if the high magnetic permeability layer 204 is provided as in this embodiment, the direction of magnetic flux can be changed without reflection even if the pressure sensor is bonded to metal, and therefore, the energy loss can be prevented. Therefore, the advantages of increasing the electric power energy which can be obtained in the antenna 208 and being capable of increasing the communication distance occur. In FIG. 10, a metal layer 214 is placed in parallel with the high magnetic permeability layer 204, and by constructing the metal layer 214 of metal such as aluminum, the advantage that the electric power acquisition characteristics do not change even when various kinds of metals exist under the metal layer 214 is provided. However, the metal layer 214 can be made unnecessary when the antenna is optimized in accordance with the kind of metal existing below. In the case of this embodiment, since the high magnetic permeability layer 204 and the diaphragm part 201 interfere with each other similarly to the case of the above described film 207, it is necessary to provide a through-hole 218 in the high magnetic permeability layer 204. A notch may be provided instead of the through-hole 218.

This embodiment is characterized in that the above described antenna member is provided with a high magnetic permeability layer having higher permeability than an adjacent member existing in its periphery.

Besides, the high magnetic permeability layer has a notched part in an area which overlaps the above described semiconductor chip. It is preferable to include at least an area which overlaps the pressure sensor part in the case of overlapping the chip.

In concrete, it is possible to provide the embodiment in which at least a silicon chip having an electronic circuit capable of measuring pressure, an antenna and a high magnetic permeability layer are provided on a film or a thin plate, the high magnetic permeability layer is provided on a surface of the film or the thin plate which surface is not a surface provided with the silicon chip, and a through-hole or a notch is provided in the high magnetic permeability layer.

Figure 11:
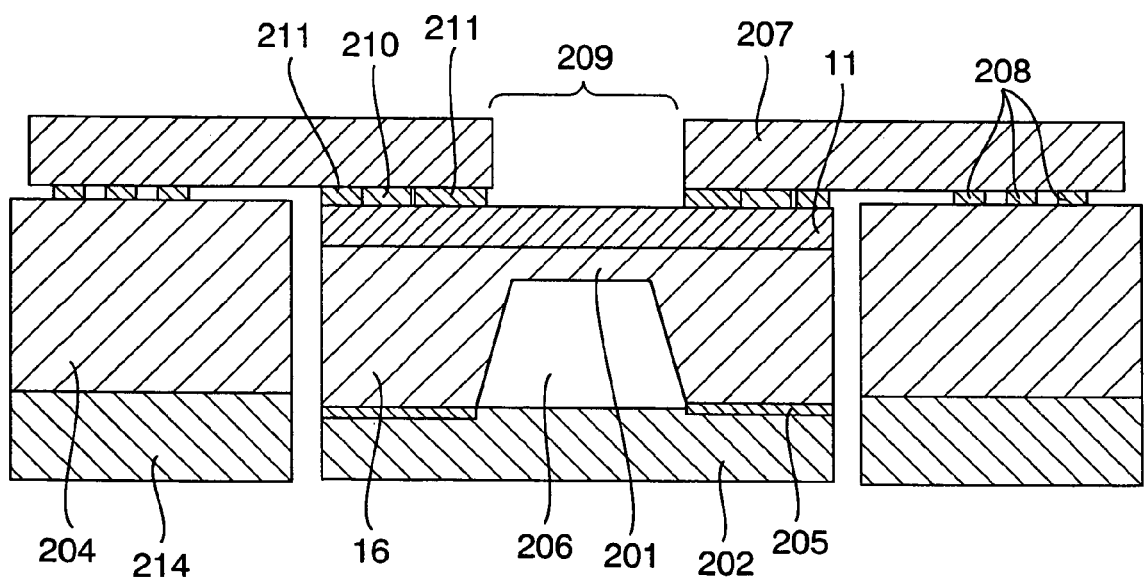
FIG. 11 is a schematic sectional view of the pressure sensor system in the first embodiment of the present invention.

As shown in FIG. 11, the high permeable layer 204 may be provided in the same plane as the silicon substrate 16. The silicon substrate 1 and the high magnetic permeability layer 204 are provided with respect to the film 2. Further, a plurality of high magnetic permeability layers 204 may be provided, and the silicon chip may be provided at a position so as to straddle over the plurality of high magnetic permeability layers.

In this embodiment, since the electromagnetic wave energy externally obtained decreases when a conductive member exists in a peripheral part of the pressure sensor, in order to prevent this, the high magnetic permeability material is placed at the antenna part. This high magnetic permeability material also becomes a factor to hinder accurate pressure measurement, similarly to the film. In order to solve the problem, for example, the through-hole 218 is provided in the high magnetic permeability layer 204. The installation position of the through-hole 218 in the high magnetic permeability layer 204 includes an inside of the area where the silicon chip 2 is placed.

In concrete, it is preferable to include the following embodiment.

At least a silicon chip having an electronic circuit capable of measuring pressure, an antenna and a high magnetic permeability layer are provided on a film or a thin plate, the high magnetic permeability layer is provided on a surface of the film or the thin plate which surface is not a surface provided with the silicon chip, and a through-hole or a notch are provided in the high magnetic permeability layer.

The in-plane installation position of the through-hole or the notch in the high magnetic permeability layer includes an inside of the area where the silicon chip is placed.

At least a silicon chip capable of measuring pressure, an antenna and a plurality of high magnetic permeability layers are provided on a film or a plate, the plurality of high magnetic permeability layers are provided on a surface a film or a plate which surface is not a surface provided with the silicon chip, and the silicon chip is provided at a position so as to straddle over the plurality of high magnetic permeability layers.

Figure 12:
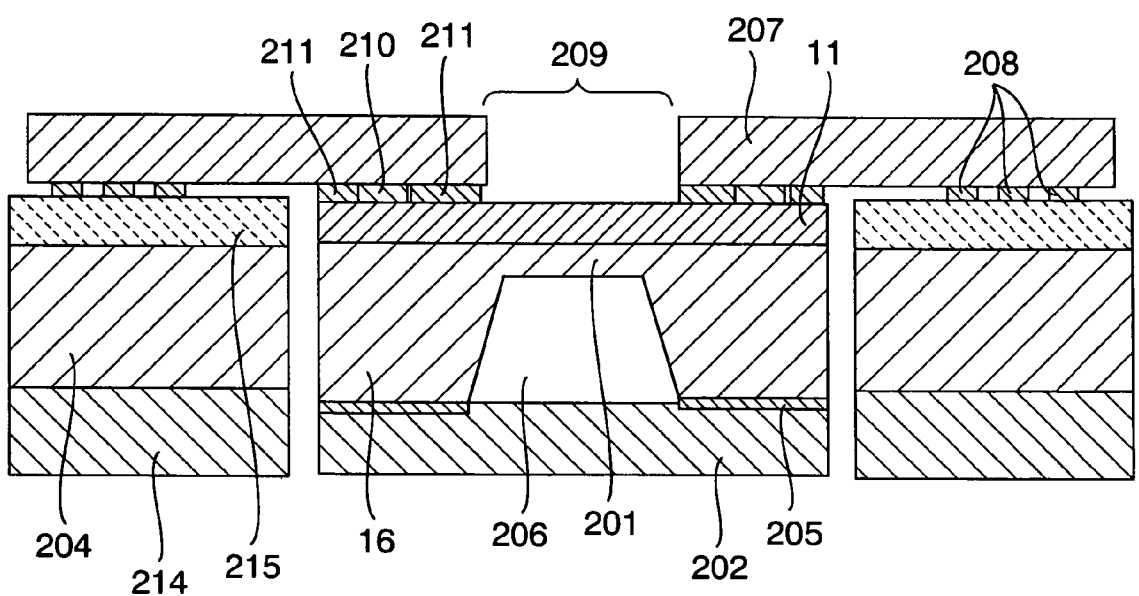
FIG. 12 is a schematic sectional view of the pressure sensor system in the first embodiment of the present invention.

As shown in FIG. 12, a spacer 215 may be provided between the antenna 208 and the high magnetic permeability layer 204. In this case, the magnetic flux naturally passes in a loop of the antenna 208, and therefore, the advantages of increasing electric power energy to be obtained and further extending the communication distance are obtained.

This embodiment is characterized in that the above described semiconductor chip is disposed in an area of a notched part of the substrate, such as the film of the pressure sensor.

In concrete, for example, the antenna member has a substrate and an antenna part formed on the substrate, and a surface on a side where the antenna part is formed of the above described antenna member and a surface on which the above described transmit control circuit of the above described semiconductor chip is formed may be disposed so that those surfaces face to the same side.

In concrete, the pressure sensor is characterized by including, on a film or a plate, at least a silicon chip having an electronic circuit capable of measuring pressure, an antenna and a high magnetic permeability layer, and characterized in that the high magnetic permeability layer is provided on a surface of the film or the thin plate where the silicon chip is provided, and that a through-hole or a notch is provided in the high magnetic permeability layer.

The pressure sensor is characterized in that the size of the above described through-hole or the width of the notch is larger than the outside dimension of the silicon chip.

Figure 13:
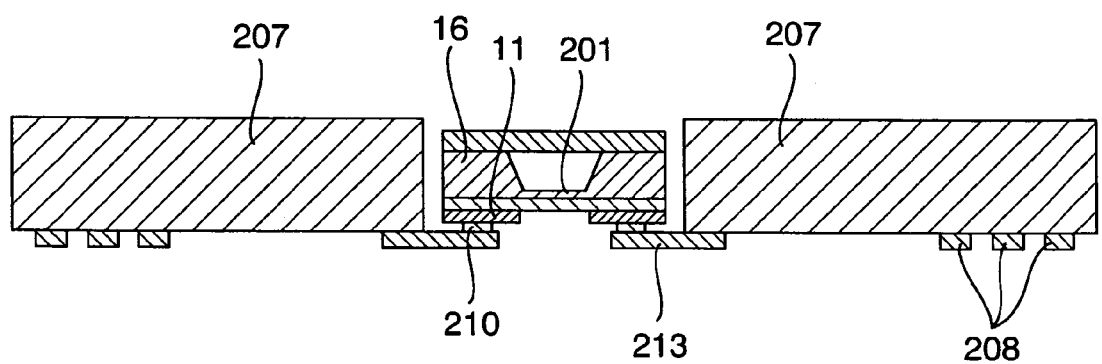
FIG. 13 is a schematic sectional view of the pressure sensor system in the first embodiment of the present invention.
Figure 14:
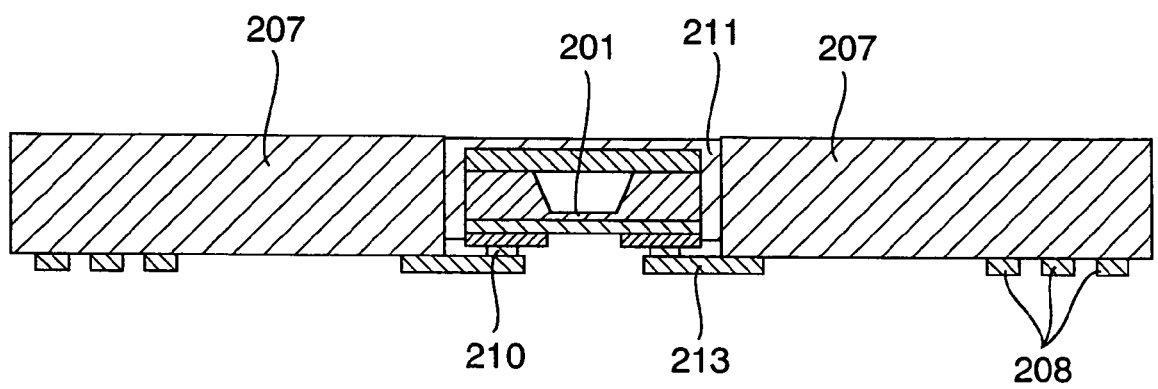
FIG. 14 is a schematic sectional view of the pressure sensor system in the first embodiment of the present invention.

FIG. 13 shows an embodiment in the case where the silicon chip 2 is buried inside the film 207. The silicon chip 2 is buried in the film 207, so that the connection part 210 and the conductive layer which is connected to the connection part 210 do not exist on the diaphragm part 201. Since pressure is directly added to the diaphragm part 201 in this case, no pressure loss occurs, and the advantage of being capable of accurately measuring dynamic pressure fluctuation occurs. Since the diaphragm part 201 and the film 207 do not contact each other, deformation of the diaphragm part 201 provides an ideal spherical shape, so that accurate pressure measurement becomes possible. In this case, the silicon chip 2 is buried, and thereby, the advantage of being capable of making the pressure sensor thinner occurs. In this case, a soft passivation film such as silicon rubber and an organic film, or a thin oxide film or a nitride film may be formed on an upper portion of the diaphragm part 201 within a range in which the deformation of the diaphragm part 201 does not significantly change. In this case, the wiring existing in a strain detecting portion on the diaphragm part 201 can be protected, and therefore, there is the advantage of being capable of realizing the pressure sensor system 1 excellent in long-term reliability. As shown in FIG. 14, a back surface of the silicon chip 2 may be fixed with a fixing part 211. In this case, the fixing part 211 is configured so as not to cover the device forming surface, especially, the diaphragm part 201. Since the silicon chip 2 can be reliably fixed in addition to the above described advantage in this case, the advantage of being capable of performing reliable measurement without breakage even when an unexpected external force is loaded occurs.

This embodiment is characterized by including at least a film or a plate, a silicon chip capable of measuring pressure and an antenna, wherein a part or all of the silicon chip is buried inside the film or the plate, and a part or all of the device forming surface of the silicon chip includes an area out of a sealing part.

Figure 15:
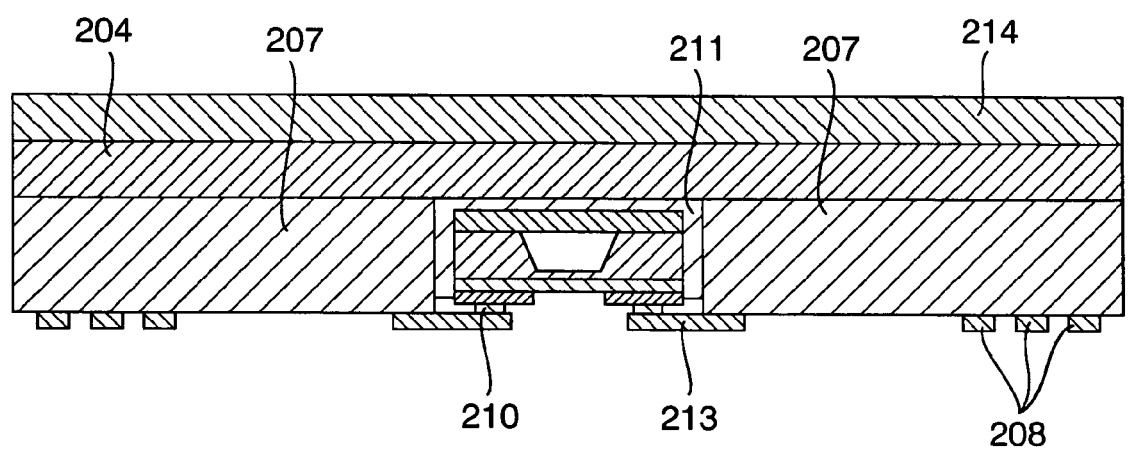
FIG. 15 is a schematic sectional view of the pressure sensor system in the first embodiment of the present invention.
Figure 16:
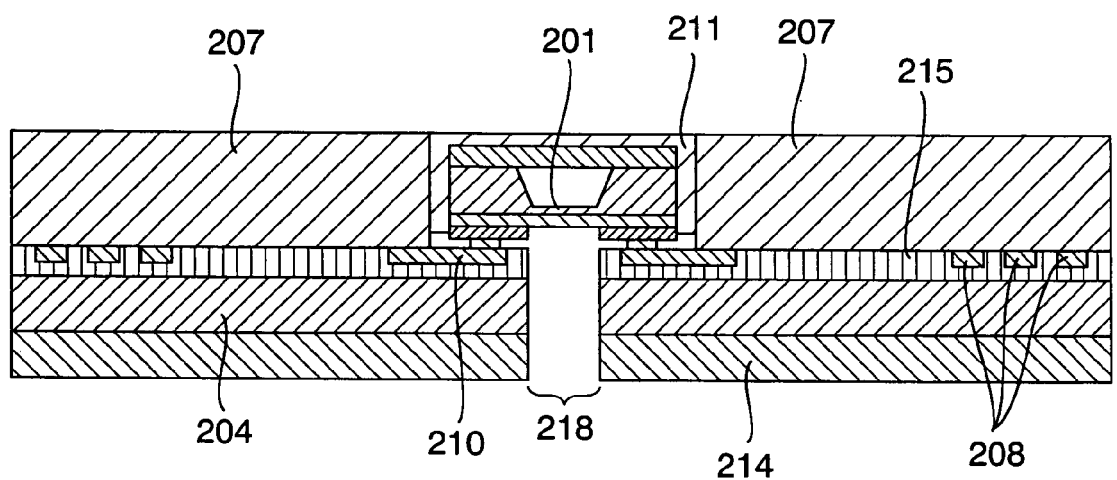
FIG. 16 is a schematic sectional view of the pressure sensor system in the first embodiment of the present invention.
Figure 17:
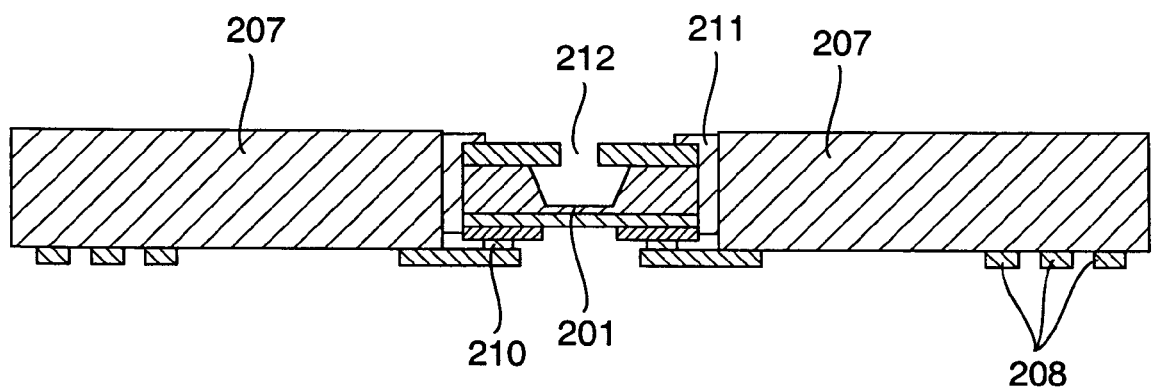
FIG. 17 is a schematic sectional view of the pressure sensor system in the first embodiment of the present invention.

FIGS. 15 and 16 show the case provided with the high magnetic permeability layer 204. The high magnetic permeability layer 204 is provided in a plane of the film 207 on an opposite side to the sensor forming side of the silicon chip 2. The metal layer 214 is provided on it. In this case, there is provided the advantage that communication becomes possible even when a metal is placed in its periphery. When measuring differential pressure, the arrangement shown in FIG. 17 provides the same effect.

In the embodiment of the present invention shown in FIGS. 5 to 9, a device forming area 11 is disposed so as to be in contact with gas or the like which is the measured object, and therefore, light is externally irradiated thereon. In an ordinary RFID tag, the device forming area 11 is connected to the film 207 and sealed with a resin, and thus the device forming area 11 is not irradiated with the light in many cases. However, in the present invention, the device forming area 11 becomes more susceptible to light due to the invention for performing accurate pressure measurement, resulting in a side effect that the characteristics are easily varied. Namely, since the silicon chip 2 changes in mobility of electron by irradiation of the light, there arises the problem of causing characteristic fluctuation when the outside of the pressure sensor system 1 is bright. Therefore, it is desirable to provide a light shielding layer on the surface of the silicon chip 2 in the present invention. It is also desirable that the light shielding layer is as thin as possible in view of preventing the deformation of the diaphragm part 201, while sufficient light shielding characteristics have to be obtained. By providing the light shielding layer on the surface of the silicon chip 2 as described above, there is the advantage that the characteristics do not change even when the measurement is performed in a place in which the light exists, so that the accurate measurement is performed.

Figure 18:
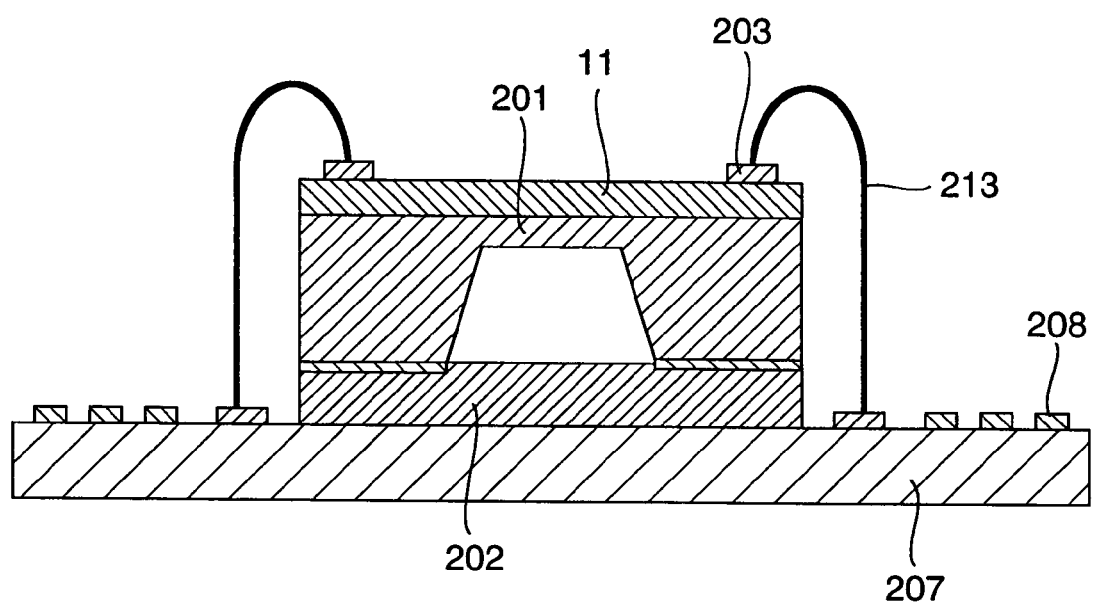
FIG. 18 is a schematic sectional view of a pressure sensor system in a second embodiment of the present invention.

A second embodiment of the present invention is the case where a back surface of the sealing part 202 is brought into contact with the film 207 as shown in FIG. 18. A surface on an opposite side to an element forming surface of the silicon chip is placed on the film 207. The connecting part 210 and the antenna 208 are electrically connected with a metal material 213 such as wire bonding and a metal thin plate. In this case, the diaphragm 201 and the film 207 do not interfere with each other, and therefore, accurate pressure measurement becomes possible. Since rigidity of the film 207 is added to the rigidity of the silicon chip 2, the strain applied to the diaphragm part 201 and the device forming surface 11 can be made small even when an external force such as bending stress is loaded, and therefore, the advantage of being capable of measuring with high accuracy is provided. This embodiment is characterized by including a film or a plate, a silicon chip capable of measuring pressure and an antenna, and characterized in that the film or the plate and a device forming surface of the silicon chip are placed so as not to be opposed to each other.

Figure 19:
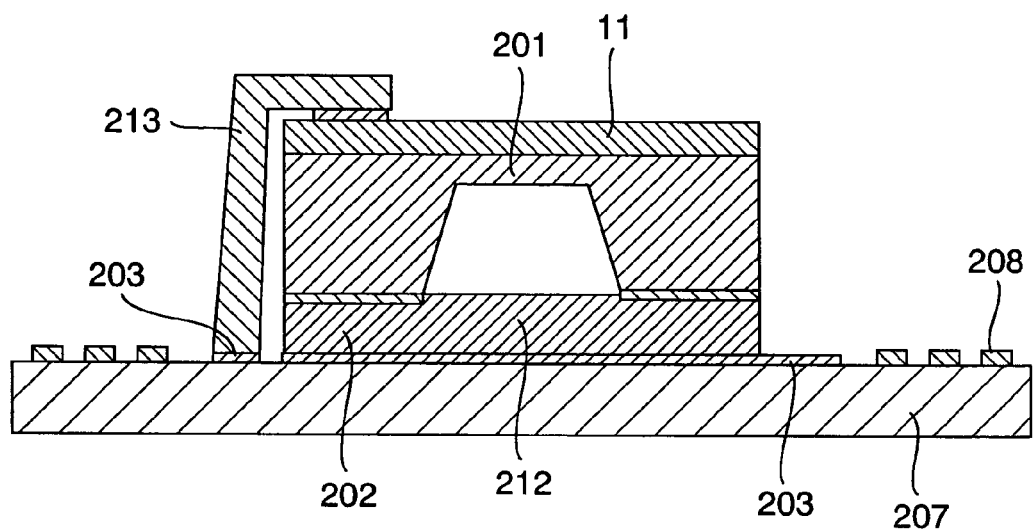
FIG. 19 is a schematic sectional view of the pressure sensor system in the second embodiment of the present invention.
Figure 20:
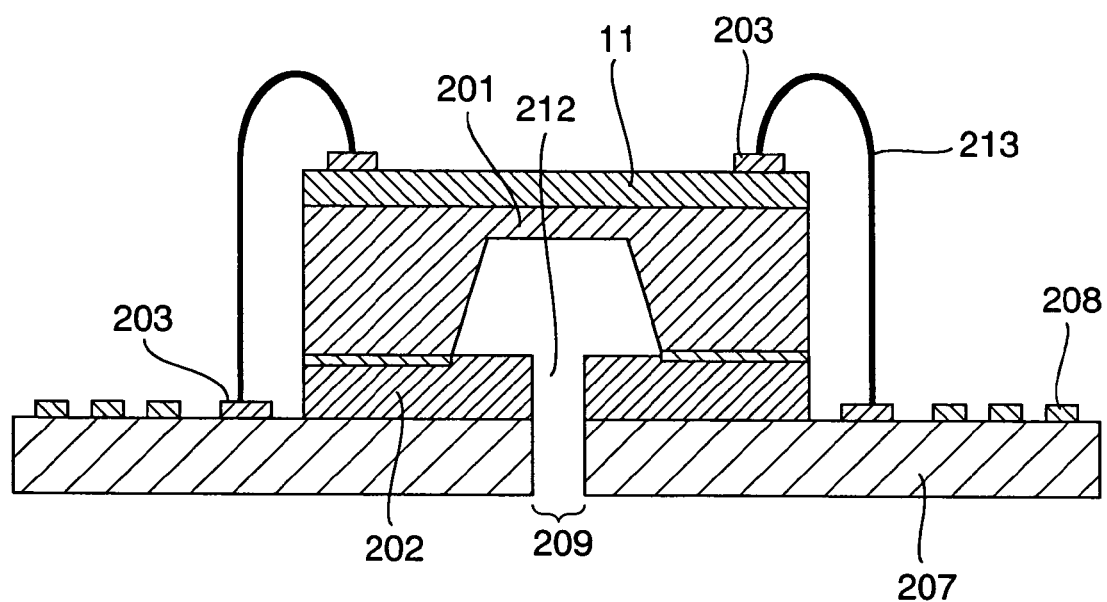
FIG. 20 is a schematic sectional view of the pressure sensor system in the second embodiment of the present invention.
Figure 21:
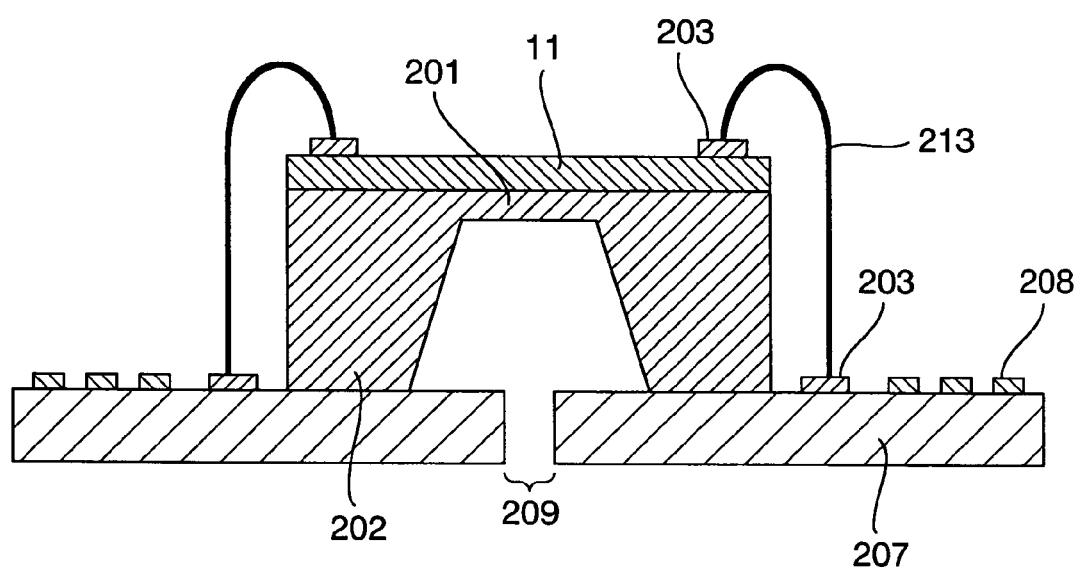
FIG. 21 is a schematic sectional view of the pressure sensor system in the second embodiment of the present invention.

When one terminal connected to the antenna 208 is formed on a front and back surface of the silicon chip 2, and the other terminal is formed in the device forming surface 11 as shown in FIG. 19, only the terminal on one side may be connected to the antenna via the metal material 213 and the electrode on the back surface of the silicon chip 2 may be connected to the antenna 208 formed on a surface of the film 207. In this case, there is the advantage that even if the electrode on the surface of the silicon chip 2 is made relatively large, deformation of the diaphragm 201 is not hindered, in addition to the above described advantage. Further, there is the advantage of being capable of manufacturing the pressure sensor at low cost because a connecting process of the silicon chip 2 and the external antenna 3 can be simplified. When differential pressure is further measured, an air hole 212 may be provided in the sealing part 202 as shown in FIG. 20, and a through-hole 209 is further provided in the film 207. In this case, fluid and liquid, which are measured objects, pass through the air hole 212 and the through-hole 209 and apply pressure to the diaphragm part 201, and therefore, measurement of the differential pressure with high accuracy becomes possible. Further, a surface of the diaphragm part 201 does not contact the film 207 in this arrangement, and therefore, measurement with high accuracy becomes possible. The structure without the sealing part 202 as shown in FIG. 21 may be adopted. In this case, sealing and packaging can be performed at the same time, and therefore, there is the advantage that production at low cost is made possible.

A pressure sensor system provided with a bonding wire includes a semiconductor chip having a pressure sensor and a transmit control part to which a signal based on a measurement value of the above described pressure sensor is inputted, and an antenna member to which the above described semiconductor chip is fixed, which antenna member has an antenna electrically connected to the above described transmit control part, and is formed so that a surface of the above described semiconductor chip on an opposite side to a surface on which the above described transmit control circuit is formed is supported on the above described antenna member.

For example, an electrode on the semiconductor chip and a surface of the above described antenna member can be further connected via a bonding wire.

Figure 23:
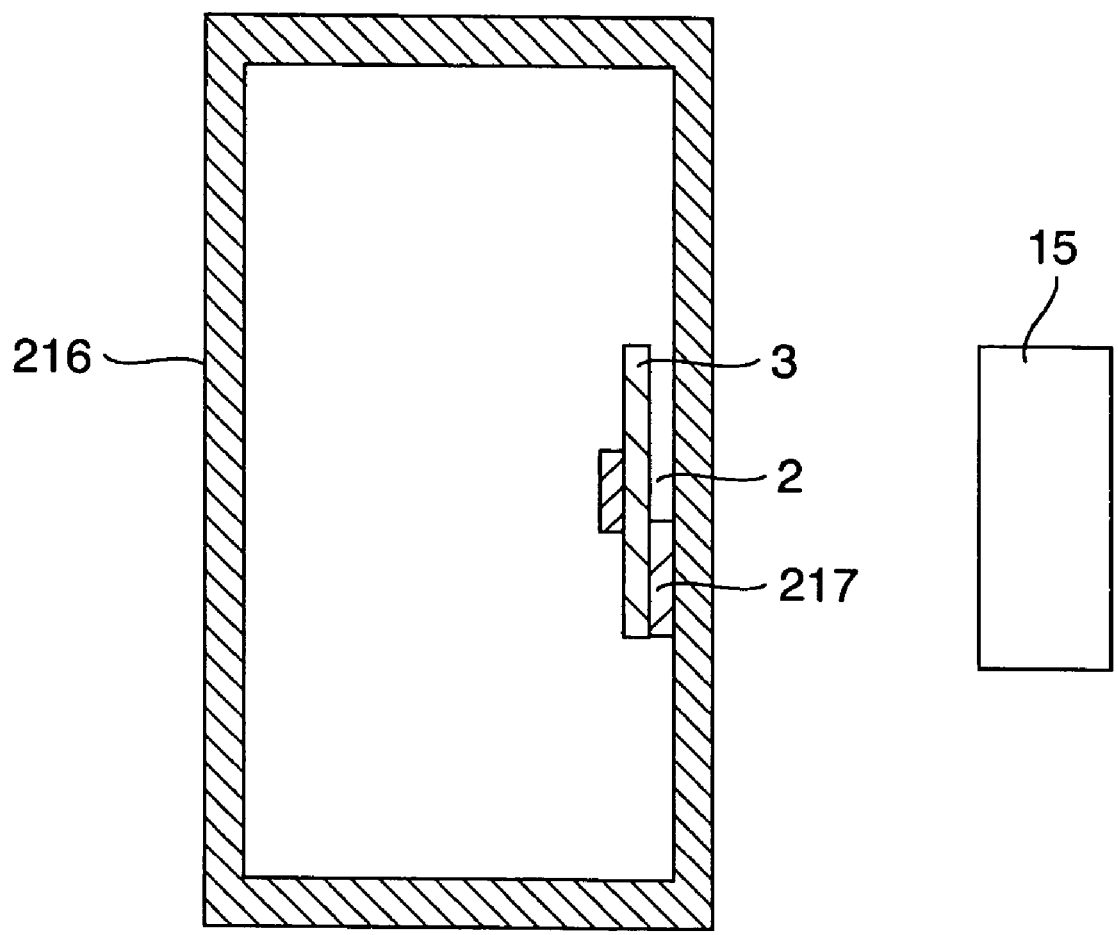
FIG. 23 is a schematic view of the pressure measuring system of the present invention.
Figure 24:
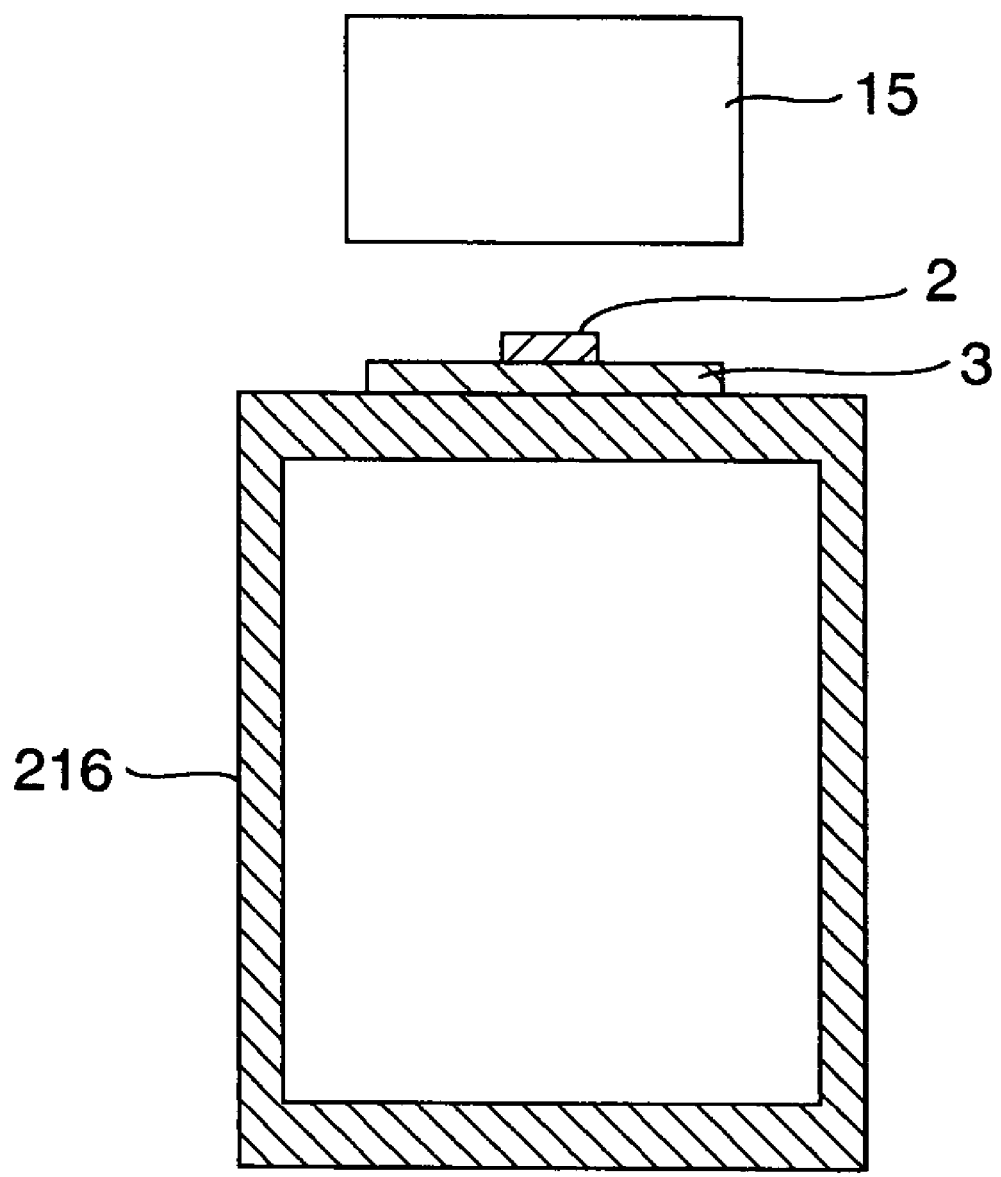
FIG. 24 is a schematic view of the pressure measuring system of the present invention.

FIG. 22 shows a pressure measuring system using the pressure sensor system 1 of the present invention. The pressure sensor system 1 which measures absolute pressure is provided inside a container 216, and a measurement value of the pressure sensor system 1 is received by the reader 15 provided outside the container 216 by wireless, and is stored in an information storing part in the reader 15 which records information. The film 207 is fixed in the state substantially parallel with an inner wall of the container 216. The surface of the silicon chip on the opposite side to the surface where the diaphragm side is formed is located on the inner wall side of the container 216. In this manner, the inner wall of the container 216 is placed so as to be close to the sealing part 202, and the diaphragm part 201 is placed so as not to interfere with the inner wall of the container 216. As shown in FIG. 23, the surface of the silicon chip 2 where the diaphragm is formed is formed to be located at the inner wall side of the container 216. A jig 217 which is made so that the inner wall and the diaphragm part 201 do not interfere with each other as described above and pressure loss is small may be placed to place the film 207 close to the inner wall. It is desirable that the container 216 is constructed by a material which does not have electric conductivity such as an organic material. According to this embodiment, the pressure sensor system 1 is provided at the inner wall of the container 216, and the pressure sensor system 1 can be operated by electromagnetic energy irradiated from an outside of the container 216. Therefore, there is the advantage of not requiring replacement of the power supply as performed in the conventional wireless system using a battery or the like. Accordingly, if the pressure sensor system 1 is placed at the time of manufacturing the container 216, measurement is possible semi-eternally, and therefore, there is the advantage that a sealed container which is sealed at the time of finishing the manufacturing process and is difficult to remove may be placed to use it semi-permanently thereafter. Since the pressure sensor system 1 operates with a small number of components and is very compact, there is the advantage of being easily installed in a sealed container through a small insertion hole. Since the inner pressure of the container 216 can be accurately detected with the diaphragm part 201 through the through-hole 209 without contact of the diaphragm part 201 and the film 207 as described in the first embodiment, there is the advantage that accurate measurement is possible.

FIG. 23 shows a system which detects inner and outer differential pressure of the container 216. The pressure sensor system 1 is provided in the container 216, one of the front and back surfaces of the silicon chip contacts gas or liquid in the container 216 and the other one is under the atmospheric pressure. The measurement value of the pressure sensor system 1 is received by the reader 15 provided outside the container 216 by wireless, and is stored in the information storing part which records information in the reader 15. More preferably, a line and a cellular phone function are included and after collecting data, the data is transmitted to the Internet and a host computer via an electromagnetic recording medium such as a flash memory card. Preferably, a display part for displaying that the information is taken in is included. Since it has the characteristic that the antenna 208 and the film 207 are provided outside the container 216, there is the advantage of being capable of detecting the pressure by wireless from an outside of the container even when the container 216 is conductive. Since the antenna 208 and the film 207 are provided on a surface layer of the container 216, the advantage of being capable of reliably packaging without peeling off by bonding the film 207 and the container 216. When the film 207 and the container 216 are bonded, the high magnetic permeability layer 204 or the like may be interposed therebetween, and in such a case, there is the advantage that communication is made possible even when the container 216 is a metal. It is desirable that the device forming area 11 of the silicon chip 2 does not contact the gas or the liquid in the container. In this case, there is the advantage that reliable measurement can be performed even when a corrosive medium exists in the container.

According to the embodiments described above, any of the following operational effects can be obtained.

According to the embodiment, since the film 207 does not contact the diaphragm 201 in the silicon chip 2 at the time of loading pressure, deformation of the diaphragm part 201 does not become nonlinear but becomes close to an ideal shape. Therefore, pressure measurement with high accuracy becomes possible.

According to this embodiment, since the pressure of the gas or the fluid is directly transmitted to the diaphragm part 201 through the through-hole 209 provided in the film 207, the pressure measurement with high accuracy is made possible without pressure loss.

According to this embodiment, since the pressure of the gas or the fluid is directly transmitted to the diaphragm part 201 through the through-hole 209 provided in the film 207, the pressure change sensed by the diaphragm part 201 is not insensitive, thus making it possible to measure the pressure variation at high speed.

According to the embodiment, since the thin diaphragm part 201 can be protected with the film 207, there is the advantage that reliable measurement is possible even when it is used for long time.

A temperature sensor and an RFID tag begin to be formed on a silicon substrate. In the RFID tag, a silicon chip and an antenna are formed on a film, and it is an ordinary usable embodiment to use the tag by sticking the film on an article.

It has been made clear that when the pressure sensor of which circuit is operated by electromagnetic energy is to be obtained by forming the pressure sensor and the RFID tag on the silicon chip, the pressure cannot be accurately measured.

Namely, the silicon chip and the antenna are formed on the film or the thin plate in this pressure sensor system, however, it can be suppressed that one side surface of the diaphragm part is closed by the film at the time of installation of the silicon chip 2 so that the accurate pressure is not transmitted to the diaphragm part and thereby accurate measurement becomes impossible, according to this embodiment. Alternatively, after installation of the silicon chip 2, it can be restrained that the diaphragm part and the film of the pressure sensor system contact each other and interfere with each other so that deformation of the diaphragm at the time of pressurization gets out of the essential state to reduce accuracy.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A pressure sensor system, comprising:
   a semiconductor chip comprising a pressure sensor and a transmit control part to which a signal based on a measurement value of the pressure sensor is inputted; and
   an antenna member to which said semiconductor chip is fixed, the antenna member comprising an antenna electrically connected to the transmit control part, wherein
   said antenna member comprises a notched part in an area which overlaps said semiconductor chip.

2. The pressure sensor system according to claim 1, wherein the pressure sensor is located in the area where the notched part is formed.

3. The pressure sensor system according to claim 1, further comprising a plurality of said antenna members, wherein said semiconductor chip is fixed to the plurality of antenna members.

4. The pressure sensor system according to claim 1, wherein said semiconductor chip is disposed in the area of the notched part of the substrate.

5. The pressure sensor system according to claim 1, wherein said antenna member is provided with a high magnetic permeability layer having higher magnetic permeability than a peripheral member thereof.

6. The pressure sensor system according to claim 4, wherein the substrate comprises a high magnetic permeability layer with the notched part, and said semiconductor chip is disposed in an area where the notched part is formed.

7. A pressure measurement receiving device, comprising a receiving part which receives a signal from the pressure sensor system according to claim 1 installed in an object to be measured, and a recording part which records the received signal.

8. A pressure measuring container comprising a container capable of accommodating liquid or gas therein, and said pressure sensor system according to claim 1 disposed in the container, wherein a surface of said semiconductor chip, on which surface the transmit and reception control circuit is formed, is disposed so as to be opposed to an inner wall of the container.

9. A pressure measuring container comprising a container capable of accommodating liquid or gas therein, and said pressure sensor system according to claim 1 disposed in the container, wherein a back surface of a surface of said semiconductor chip on which the transmit and reception control circuit is formed is disposed so as to be opposed to an inner wall of the container.

* * * * *